Aug. 11, 1959   R. J. CULLETON ET AL   2,899,114
PRESSURE CAP WITH DUMP VALVE AND PRESSURE RELIEF VALVE
Filed Aug. 13, 1956   3 Sheets-Sheet 1

INVENTORS
ROBERT J. CULLETON
JAMES W. KRAGH
BY
William R Lane
ATTORNEY

Aug. 11, 1959   R. J. CULLETON ET AL   2,899,114
PRESSURE CAP WITH DUMP VALVE AND PRESSURE RELIEF VALVE
Filed Aug. 13, 1956   3 Sheets-Sheet 2
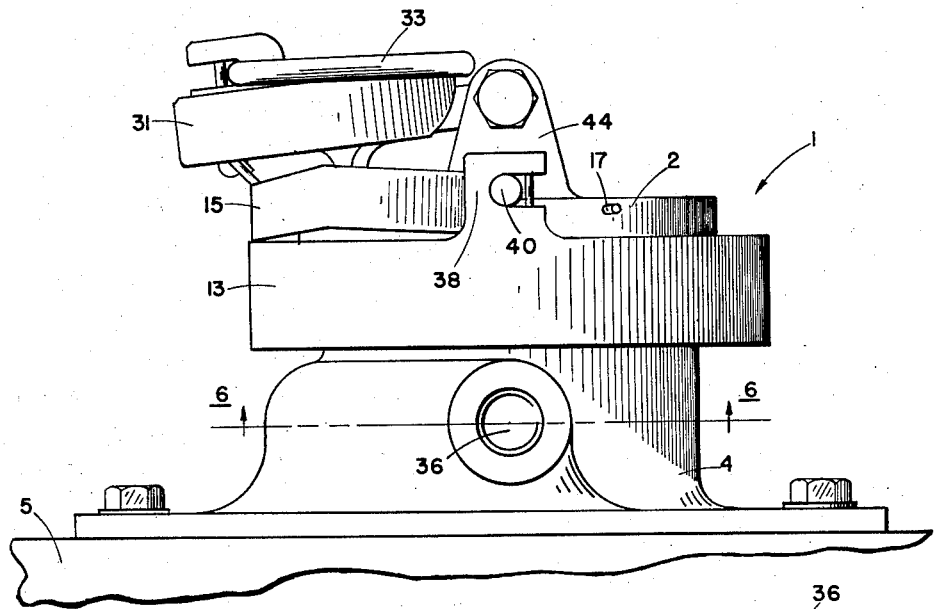
FIG. 3
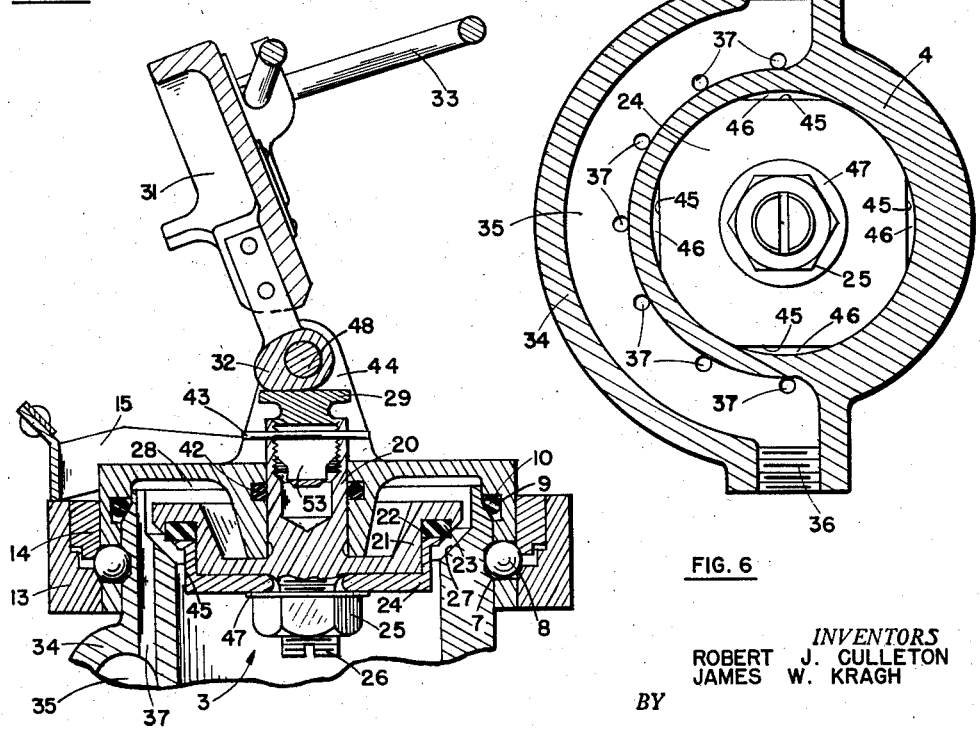
FIG. 4
FIG. 6
INVENTORS
ROBERT J. CULLETON
JAMES W. KRAGH
BY
William R. Lane
ATTORNEY Aug. 11, 1959     R. J. CULLETON ET AL     2,899,114
PRESSURE CAP WITH DUMP VALVE AND PRESSURE RELIEF VALVE
Filed Aug. 13, 1956                3 Sheets-Sheet 3
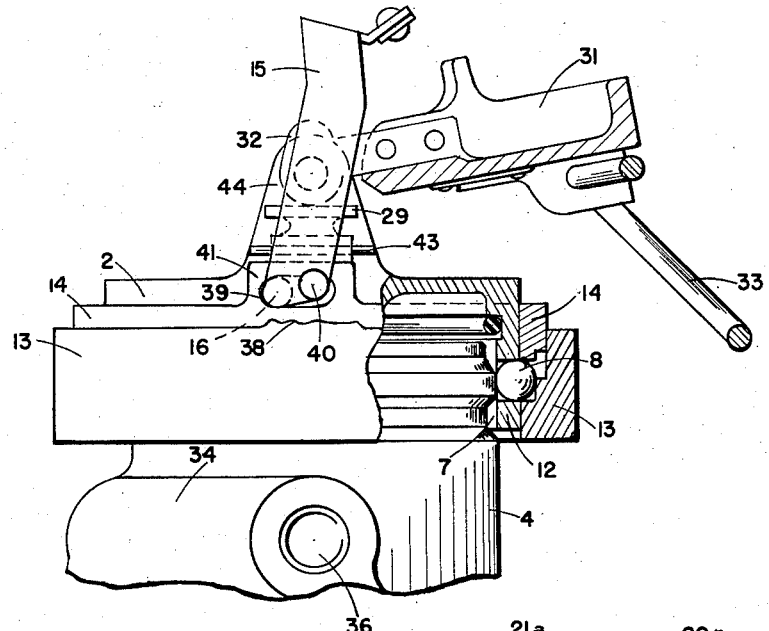
FIG. 5
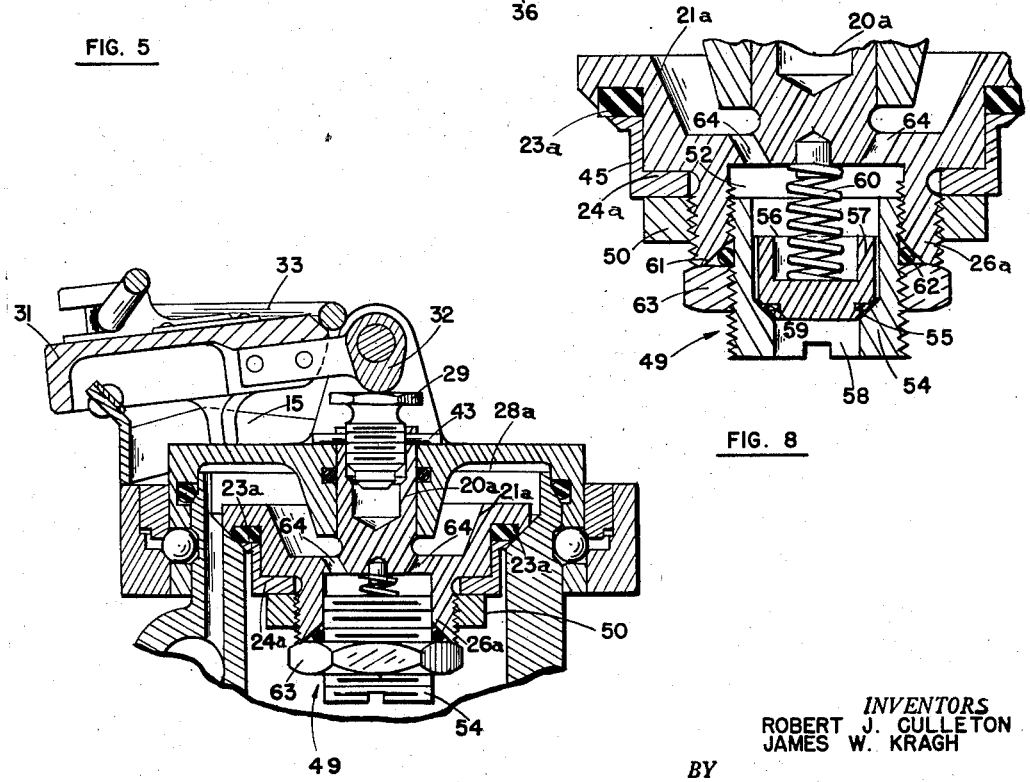
FIG. 8
FIG. 7
INVENTORS
ROBERT J. CULLETON
JAMES W. KRAGH
BY
William R. Lane
ATTORNEY United States Patent Office 2,899,114
Patented Aug. 11, 1959

2,899,114

PRESSURE CAP WITH DUMP VALVE AND PRESSURE RELIEF VALVE

Robert J. Culleton, Los Angeles, and James W. Kragh, Culver City, Calif., assignors to North American Aviation, Inc.

Application August 13, 1956, Serial No. 603,712

12 Claims. (Cl. 222—396)

This invention relates to a closure device for pressurized tanks and particularly relates to a closure device for coaction with a tank nozzle wherein the tank pressure will necessarily be released by the sequence of operations required to release and remove the closure device from the nozzle.

Various types of closures are presently available that will result in depressurization of the attached container prior to closure removal when the closures are sequentially operated, however, these devices allow the released gases, vapors, fumes and liquids to be blown directly outwardly through the cap or closure device. This is disadvantageous from the operator's standpoint and creates a hazardous condition when tanks containing inflammable substances are depressurized in this manner. The present invention is directed to improvements in such closure devices whereby release of the container pressure will necessarily be effected as the handles on the device are sequentially manipulated to effect removal of the closure and the pressurizing gas, foam, vapors, and liquids will be discharged at a remote predetermined location without harm to the operator or danger of creating a fire hazard.

The invention broadly contemplates a closure device having a hollow cylindrical body member closed at one end adapted to set over a cylindrical coacting tank filler nozzle. The body member has detents radially movable inwardly under the biasing force of coacting concentric camming rings slidably mounted on the outer wall of the cylindrical body member. The detents engage an annular groove on the outer surface of the nozzle and lock the body member thereto. A second sealing portion of the closure device is reciprocable within a central bore of the device and is adapted to seat on and engage an interior annular shoulder on the nozzle thereby sealing the tank. The cylindrical body member and the second sealing portion of the closure, when in sealing relation with the nozzle, form therewith a chamber within the closure device. Conduits within the nozzle provide communication from this chamber to the atmosphere at a point on the nozzle below the closure device and extending in a radial direction. Connection may be made at this point by tubing or other appropriate conduit to further remove the gases and vapors. Upon unseating of the second portion, the tank is placed in communication with the closure chamber and hence to the atmosphere, and the tank is quickly and safely depressurized. The second portion of the closure device is locked in sealing engagement with the tank nozzle by means of an over-center cam having a handle attached thereto. This first handle covers and prevents operation of the closure operating handle whereby removal of the closure device is prevented prior to raising of the first handle with resultant depressurization of the tank.

Accordingly, it is an object of this invention to provide a tank closure device whereby a pressurized container may be depressurized without harm to the operator or danger from fire.

It is also an object of this invention to provide a closure device having its elements so arranged that the pressurized container must necessarily be depressurized prior to removal of the closure device.

It is a further object of this invention to provide a closure device wherein the gases, fumes and liquids blown out of the pressurized tank upon the opening thereof may be conducted to a predetermined safe location without interfering with the operation of the closure device.

A still further object of this invention is to provide a closure device having a portion for being positively locked to the filler nozzle and a relatively movable portion for insertion into the nozzle for effecting the controlled release of the tank pressure at a remote point.

Still a further object of this invention is to provide a closure assembly having a first handle for controlling the release of the container pressure and a second handle for operating the closure latching mechanism, whereby the first handle must be manipulated in a manner to release the tank pressure before the closure assembly can be detached from the tank nozzle by the second handle.

These and other objects and advantages of this invention will become more apparent when read in the light of the accompanying drawings and specification wherein:

Fig. 3 is an elevation view of the closure and nozzle assembly attached to a tank.

Fig. 4 is a longitudinal sectional view of the closure and nozzle assembly showing the first step in removing the closure with the depressurizing handle in raised position with the poppet valve assembly raised from the interior annular nozzle seat thereby allowing communication from the tank interior to the venting conduits in the nozzle.

Fig. 5 is an elevational view, partly in section, of the closure and nozzle assembly showing the second stage in the removal of the closure with the depressurizing handle and the closure locking handle both in raised position and the closure device partially raised from the tank nozzle.

Fig. 6 is a transverse sectional view of the nozzle taken on the line 5—5 in Fig. 4 and showing the main venting conduit.

Fig. 7 is a longitudinal sectional view of a modification of the closure device incorporating an automatic pressure relief valve in the depressurization poppet valve.

Fig. 8 is a sectional view, on an enlarged scale, of a porton of the poppet valve including the pressure relief valve.

Figure 1:
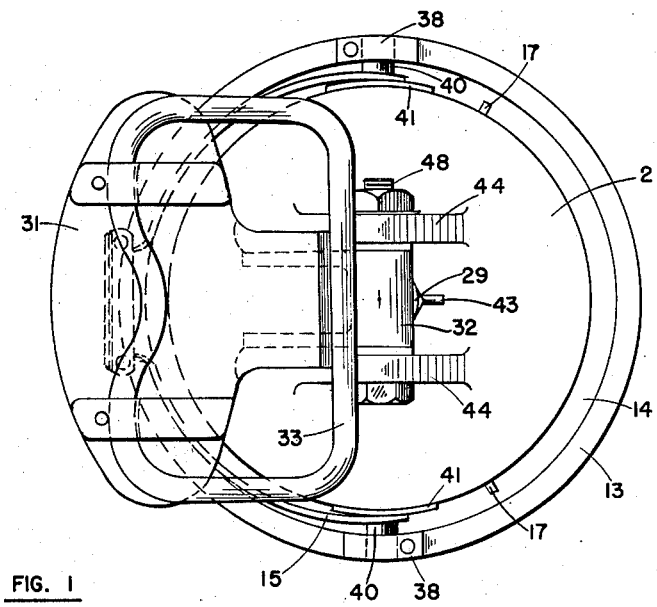
Fig. 1 is a plan view of the closure device of this invention.
Figure 2:
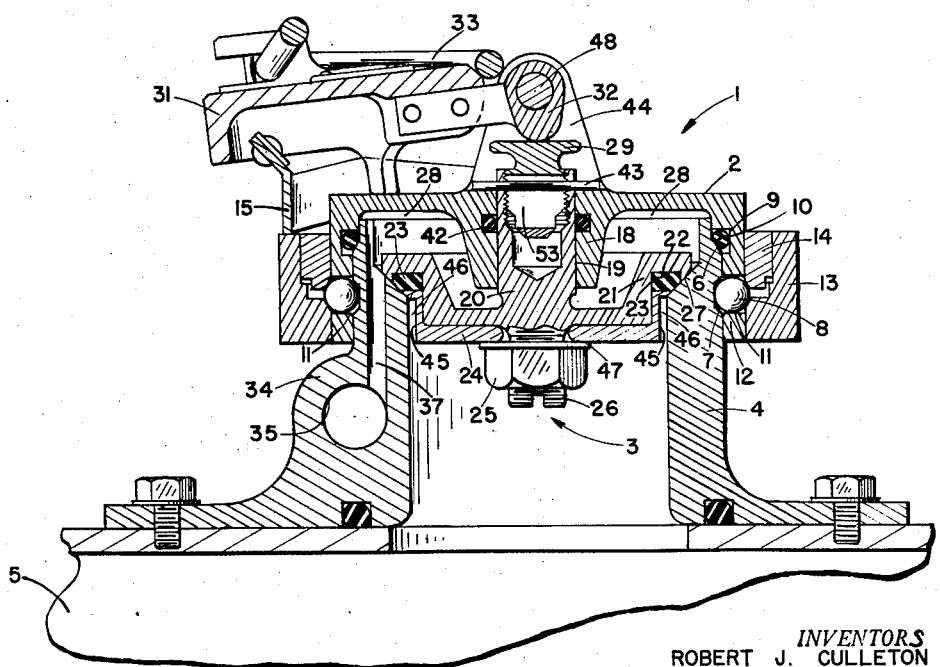
Fig. 2 is a longitudinal sectional view of the closure and nozzle assembly attached to a container showing the closure locked to and sealing the nozzle.

Referring specifically to the drawings wherein like reference characters have been used throughout the several views to designate like parts and referring at first to Fig. 2, reference numeral 1 designates generally the assembled closure device which comprises an outer closure member 2 and an inner closure member or poppet valve 3 all adapted for sealing engagement on and closure of a nozzle 4 which communicates with a tank or container 5 requiring periodic access.

The upper end of the cylindrical filler pipe or nozzle 4 is of a reduced thickness and has a bevelled annular surface on the exterior thereof slightly below the upper end of the nozzle forming an annular seat 6 for sealing engagement by a ring gasket in the closure cap to be described in detail hereinbelow. On the main body of the nozzle 4, at a point below annular seat 6, a peripheral annular groove 7 is formed to receive detents or balls 8 under coupling condition. For purposes of illustration a flange is shown integral with the filler neck or nozzle 4 at the lower end thereof for connection to the tank or reservoir by bolting, welding or any other suitable means of connection.

Outer closure 2 is of a generally inverted cup shape with an annular groove 9 formed in the depending circular portion thereof for reception of an O-ring 10 which seats on the annular seating surface 6 of nozzle 4 when the outer closure 2 is locked in position on the nozzle. A plurality of angularly spaced circular apertures 11 are formed in the cylindrical wall 12 at a point substantially opposite groove 7 on nozzle 4 when the outer closure 2 is seated on the nozzle. Associated with each of the apertures 11 is a spherical ball detent 8 which normally protrudes through the aperture 11. Concentrically mounted on the cylindrical wall 12 and freely slidable thereon is camming ring 13 having freely movable camming ring 14 nesting therein. Upon movement of the camming rings towards each other, wall detents 8 are urged radially inwardly into locking engagement with groove 7 of nozzle 4 when closure 1 is seated on the nozzle. Upon movement of the camming rings away from each other, ball detents 8 may move radially outwardly for disengagement from groove 7.

Bail-type handle 15 is pivotally attached by pin 40 to an upstanding lug portion 38 of camming ring 13 and has angularly offset pin 16 positioned for sliding movement within a horizontal slot 39 in a lug 41 on ring 14. Due to the toggle action of the pivotally connected handle as camming ring 13 is moved in one direction, nesting camming ring 14 is moved in an opposite direction. When handle 15 is raised to an upright position, as shown in Fig. 5, the camming rings are moved away from each other forming a chamber for the reception of balls 8 whereby the closure 1 may be lifted clear of the nozzle 4. Conversely, as handle 15 is lowered to a position substantially flush with the outer closure top, the camming rings are moved simultaneously towards each other with their coacting opposed surfaces forcing ball detents 8 inwardly into locking engagement with groove 7. Stop pins 17 prevent rotation of camming ring 14 and handle 15 beyond a prescribed position.

Outer closure 2 has the central boss 18 depending therefrom with an axial bore 19 for reception of a plunger portion 20 of inner closure 3; this boss contains a suitable annular groove for reception of an O-ring 42 to provide a fluid-tight seal between the surface of bore 19 and plunger 20.

The poppet valve 3 comprises a circular disc 21 integral with and a spaced distance below plunger portion 20. Disc 21 has an upstanding inverted L-shaped edge having a downwardly facing annular groove 22 for reception of an O-ring gasket 23 having a rectangular cross-section. O-ring 23 is secured in position by retaining member 24 which is securely locked to the assembly by washer 47 and a nut 25 in threaded engagement with lower stem 26 of the inner closure. Gasket 23 is positioned for sealing engagement with the interior annular bevelled seating surface 27 of nozzle 4. As best shown by Fig. 6, flat surfaces 45 are formed on the circular upstanding peripheral edge of member 24 at an angular spacing of ninety degrees from each other. These flat surfaces do not extend the full height of the upstanding peripheral edge and together with the inner wall of nozzle 4 define passageways 46 which are closed when poppet valve 3 is seated on bevelled surface 27 but which allow communication from the tank interior to chamber 28 when valve 3 is raised so as to unseat gasket 23 from seating surface 27. Plunger 20 is bored and threaded at its upper end for threaded engagement with a slotted adjustable plug 29. Plug 29 provides for adjustment between the component parts so that a tight sealing engagement may be effected. To limit the downward movement of plunger 20, slot 53 is provided in plug 29 for reception of a keying pin 43. A series of diametrically opposite angularly disposed apertures are provided in the threaded portion of plunger 20 for reception of the ends of pin 43 whereby the plunger may be positively locked against rotation after adjustment.

Handle 31 for operation of the poppet valve 3 is pivotally mounted by hinge pin 48 from two upstanding spaced apart lugs 44 on the top of closure 2. Integral with handle 31 is a cam portion for bearing contact with the top of plug 29. Cam 32 has a configuration such that it is positioned past its dead center position on top of plug 29 when handle 31 is in its innermost or closed position. This effectively locks the poppet valve 3 in sealing engagement with nozzle seating surface 27 and effectively closes and seals the nozzle. A ring grip handle 33 is attached to the outer end of handle 31 to provide ease of operation of handle 31 when the closure unit is positioned in a relatively inaccessible location.

The upper surface of inner closure 3 and the inner surface of outer closure 2 together with the upper portion of nozzle 4 from an annular chamber 28 which varies in volume with the movement of poppet valve 3. Nozzle 4 has a semi-circular boss 34 extending around its outer surface at a location below the bottom portion of closure device 1. Boss 34 contains a semi-circular conduit 35 therein and has a part 36 at each end of the conduit. These ports may be connected in any suitable manner by means of a conduit to a remote location. A plurality of spaced longitudinal conduits 37 extend from the upper edge of nozzle 4 downwardly and intersect conduit 35. These conduits open into chamber 28 and provide access therefrom to outlet ports 36. It is thus apparent that upon unseating of poppet valve 3 from surface 27 communication is effected between the tank interior and the ambient atmosphere by means of chamber 28, conduits 37, conduit 35 and ports 36.

In operation, closure device 1 is placed over nozzle 4 with detents 8 opposite groove 7 on the nozzle and with the handles in an upright position. Handle 15 is then forced downwardly to its approximately horizontal closed position thereby moving the camming rings toward each other and forcing ball detents 8 into engagement with groove 7. O-ring 10 is thus forced into sealing engagement on annular seat 6 of the nozzle. Handle 31 is then depressed to a substantially horizontal position, causing cam 32 which acts on plug 29 to force the poppet valve assembly 3 downwardly until gasket 23 seats on surface 27 thus sealing the interior of nozzle 4 and preventing communication between the tank interior and chamber 28. The container is now fully sealed and ready for pressurizing prior to operation. In this position handle 31 covers handle 15 and must be raised prior to manipulation of handle 15. Thus it is necessary to first move handle 31 upwardly prior to movement of handle 15 to release outer closure 2 from the nozzle. Movement of handle 31 upwardly, however, causes depressurization of the tank by rotating cam 32 to a position whereby the tank pressure will move poppet valve 3 freely upwardly to unseat it from surface 27 and thereby establish communication with chamber 28 and the exterior atmosphere.

Thus it is clear that prior to removal of the assembled closure device 1 it is necessary to so operate the handles that depressurization of the tank automatically occurs prior to removal of the closure. Furthermore, such depressurization is accomplished without causing the pressurizing fluid and any entrained vapors or liquids to be discharged upwardly in proximity to the operator or adjoining structure, since these liquids and gases are conducted away from the nozzle and closure assembly to any desired remote location by means of chamber 28, the system of conduits located in nozzle 4 and discharging radially therefrom, and an exterior conduit suitably connected thereto for effecting such remote discharge.

A second embodiment of the invention is illustrated in Fig. 7 wherein the poppet valve disc portion 21a includes a pressure relief valve 49 for release of pressures in excess of a predetermined tank pressure. Valve disc 21a is formed from a raised outer rim portion with an annular groove having a gasket 23a secured therein by retainer 24a as previously described. The valve has a depending axial stem portion 26a with a coaxial bore forming a chamber 52 therein and with both the outer and inner surfaces thereof threaded. Retaining nut 50 threadedly engages stem 26a and secures retainer 24a and gasket 23a against the valve disc 21a. Hollow cylindrical valve body 54 is screw-threaded into engagement with the inner surface of stem 26a and has a bevelled shoulder 55 providing a valve seating surface therein. Gasket 59 of valve 56 seats on this surface and forms a seal thereon when valve 56 is biased to its lower position by spring 60. Valve 56 comprises a cylindrical valve portion 57 of a lesser diameter than chamber 52 and a bottom disc portion 58 having ring gasket 59 positioned thereon. Valve spring 60 holds the valve against seating surface 55 until the pressure within the tank exceeds the force exerted by the spring thereby causing the valve to raise. The inner edge of stem 26a is bevelled and forms with the intermediate portion of valve body 54 a packing gland for O-ring packing 62. Packing gland nut 63 threadedly engages the lower end of the outer surface of valve body 54 and provides for adjustment of packing 62. Passageways 64 concentrically spaced about the longitudinal axis provide communication between the upper end of chamber 52 and chamber 28a.

Thus it is apparent that we have provided a closure for a pressurized tank which effectively seals the tank against escape of the pressure or contents therein and which provides for depressurization of the tank before the closure can be removed. Furthermore, fluids vented from the tank are brought to an outlet in the nozzle from whence they can be further removed to a more remote location before disposal without interfering with the installation or removal of the closure device in any way. The increased safety resulting from a closure assembly of this type is readily apparent when reservoirs containing highly toxic or highly inflammable fluids, such as fuels, are being depressurized. While particular embodiments of this invention have been illustrated and described herein, it will be apparent that various changes and modifications may be made in the construction and arrangement of the various parts without departing from the spirit and scope of this invention in its broader aspects or as defined in the following claims.

We claim:

1. In combination, a tank, a projecting nozzle integral with said tank and having a cylindrical exterior portion and an internal annular shoulder therein, a first nozzle closure means adapted to seat on and sealingly engage the cylindrical exterior portion of said nozzle, a second nozzle closure means movable within said first closure means adapted to sealingly engage the internal annular shoulder on said nozzle, and bleed-off means in said nozzle communicating with the tank interior when said second closure means is moved in a manner to unseal the nozzle whereby the tank may be depressurized.

2. In a tank and closure therefor, a tank having a nozzle, a first nozzle closure means for releasably clamping over said nozzle, a second nozzle closure means movable relative to said first nozzle closure means for sealing insertion into said nozzle and forming with said nozzle and said first closure means a chamber above said relatively movable second closure means, and means in said nozzle for connecting said chamber to the ambient atmosphere when said movable closure means is moved relative to said first nozzle closure means in a manner to unseal the nozzle.

3. In a tank and closure therefor, a tank having a nozzle means, a closure means including a first member adapted to surround and sealingly engage the exterior of said nozzle and a second member movable relative to said first member adapted to close and sealingly engage the interior of said nozzle means; said first and second members coacting with said nozzle means to form a chamber in said closure means when in sealing engagement with the nozzle means, and means in said nozzle for communicating the chamber pressure through said nozzle to the ambient atmosphere at a location below said closure means whereby said tank may be depressurized by moving said second member relative to said first member thereby establishing communication between the tank and said chamber.

4. In a tank and closure therefor, a tank having a nozzle means defining an opening in said tank, a closure means including a first member adapted to surround and sealingly engage said nozzle and a second member reciprocable within said first member adapted to close and sealingly engage said nozzle means, a lever pivotally mounted on said first member and having a cam portion operatively contacting said second member adapted for moving and locking the same into tight sealing engagement with said nozzle means, said first and second members coacting with said nozzle means to form a chamber in said closure means when in sealing engagement with the nozzle means, and means in said nozzle for continuously communicating the chamber pressure to the ambient atmosphere at a location on said nozzle below the closure means.

5. In a tank and closure therefor, a tank having a nozzle means provided with an internal shoulder defining an opening in said tank, a closure means adapted to seat on and engage said nozzle means, a member reciprocably mounted in said closure means and sealingly engaging the internal shoulder of said nozzle means when in a closed position and forming a chamber with said closure means and said nozzle means, a hand lever pivotally mounted on said closure means and having a cam portion operatively contacting said reciprocable member for moving the same into sealing engagement with said nozzle means and for locking said reciprocable member on said nozzle means when said cam is moved past deadcenter, said nozzle means having a conduit communicating the pressure in said chamber to the atmosphere outwardly of said nozzle means at a point below said closure means whereby said tank will be depressurized upon raising said handle and allowing said reciprocable member to unseat from said nozzle means.

6. In a tank and closure therefor, a tank having a nozzle provided with an internal annular shoulder defining an opening in said tank, a closure adapted to seat on and engage the outer portion of said nozzle and having a central bore therein, a plunger means mounted for reciprocatory movement in the central bore in said closure, a hand lever pivotally mounted on said closure and having a cam operatively contacting the upper end of said plunger, said plunger having a lower portion adapted for insertion into said nozzle and into sealing contact with said internal annular shoulder, said plunger coacting with said closure and said nozzle to form a chamber over the upper end of said nozzle, and a plurality of conduits in said nozzle communicating with said chamber and with the ambient atmosphere at a point below said closure whereby the pressure in said tank may be relieved without removing said closure and may be conducted to a remote location without interfering with the operation of said closure.

7. In combination, a tank, a nozzle on said tank defining an opening into the same, a closure means including a first member adapted to surround and sealingly engage said nozzle and a second member manually reciprocable within said first member adapted to close and sealingly engage said nozzle means, said first and second members coacting with said nozzle means to form a chamber in said closure means when in sealing engagement with the nozzle means, means in said nozzle for communicating the chamber pressure to the ambient atmosphere whereby the tank may be depressurized by manually moving said second member relative to said first member and establishing communication between the tank and said chamber, and pressure responsive means for providing communication between said tank and said chamber upon an increase in the tank pressure above a predetermined value.

8. In combination, a tank having an aperture circumscribed by a nozzle, a first closure means encompassing and sealingly engaging the exterior of said nozzle, a second closure means operatively associated with said first closure means and movable relative thereto for operatively engaging and sealing the interior of said nozzle, said first and second closures and said nozzle defining a chamber therebetween, means providing communication between said chamber and the atmosphere, sequentially operable lever means for successively releasing said second closure means and then said first closure means whereby the tank interior is placed in communication with said chamber and thence with the atmosphere to depressurize the tank interior prior to release of the first closure means from the exterior of the nozzle.

9. The combination set forth in claim 8 wherein said sequentially operable lever means includes a first cam means attached to said first closure operable to move said second closure relative to said first closure into sealing engagement in said nozzle, and a second cam means for causing the first closure to sealingly engage the outer periphery of said nozzle.

10. The combination set forth in claim 8 wherein said sequentially operable lever means includes a lever actuated cam means rotatably mounted on said first closure and operable to move said second closure relative to said first closure into sealing engagement with said nozzle, and a toggle linkage actuated cam means for causing the second closure to sealingly engage the outer periphery of said nozzle rotatable about an axis parallel to the axis of said first handle.

11. The combination set forth in claim 10 wherein said lever is positioned over said toggle linkage whereby the lever must be rotated in a manner to open the second closure before said toggle linkage may be moved to a position to permit release of said first closure from the nozzle exterior and allow removal of the first and second closure means.

12. In combination, a pressure tank having an aperture surrounded by a projecting nozzle integral with said tank, a detachable first nozzle closure means releasably encompassing and sealingly engaging the exterior of said projecting nozzle, a second nozzle closure means movable relative to said first closure means for sealing insertion into said nozzle and forming with said nozzle and said first closure means a chamber above said relatively movable second nozzle closure means, and means in said nozzle for connecting said chamber to the ambient atmosphere when said second closure means is moved relative to said first closure means in a manner to unseal the nozzle.

References Cited in the file of this patent
UNITED STATES PATENTS

| | | |
|---|---|---|
| 2,162,096 | Lamorek | June 13, 1939 |
| 2,342,635 | Farber et al. | Feb. 29, 1944 |
| 2,530,092 | Smye | Nov. 14, 1950 |
| 2,541,073 | Kaufman | Feb. 13, 1951 |
| 2,625,303 | Mays | Jan. 13, 1953 |
| 2,769,580 | Hudson et al. | Nov. 6, 1956 |
| 2,822,961 | Seaquist | Feb. 11, 1958 |